United States Patent [19]

Tetzlaff et al.

[11] Patent Number: 5,301,290
[45] Date of Patent: Apr. 5, 1994

[54] METHOD FOR MINIMIZING LOCK PROCESSING WHILE ENSURING CONSISTENCY AMONG PAGES COMMON TO LOCAL PROCESSOR CACHES AND A SHARED EXTERNAL STORE

[75] Inventors: William H. Tetzlaff, Mount Kisco; Jay H. Unger, Mohegan Lake, both of N.Y.

[73] Assignee: International Business Machines Corporation, Armonk, N.Y.

[21] Appl. No.: 493,562

[22] Filed: Mar. 14, 1990

[51] Int. Cl.$^5$ ............................................. G06F 12/14
[52] U.S. Cl. ........................... 395/425; 364/DIG. 1; 364/228.1; 364/228.8; 364/251.6; 364/254.8; 364/246.8
[58] Field of Search ... 364/200 MS File, 900 MS File; 395/425, 400

[56] References Cited

U.S. PATENT DOCUMENTS

| | | | |
|---|---|---|---|
| 3,400,371 | 9/1968 | Amdahl et al. | 395/375 |
| 4,136,386 | 1/1979 | Annuziata et al. | 395/425 |
| 4,207,609 | 6/1980 | Luiz et al. | 395/325 |
| 4,604,694 | 8/1986 | Hough | 395/650 |
| 4,612,612 | 9/1986 | Woffinden et al. | 395/400 |
| 4,622,631 | 11/1986 | Frank et al. | 395/800 |
| 4,716,528 | 12/1987 | Crus et al. | 395/650 |
| 4,843,542 | 6/1990 | Dashiell et al. | 395/425 |
| 4,965,719 | 10/1990 | Shoens et al. | 364/200 |
| 4,984,153 | 1/1991 | Kregness et al. | 395/425 |
| 5,063,504 | 11/1991 | Jordan, Jr. | 395/725 |
| 5,088,026 | 2/1992 | Bozman et al. | 395/425 |

OTHER PUBLICATIONS

Lorin and Deitel, "Operating Systems", The System Programming Series, copyright 1981, Chapter 9 re Resource Management pp. 221–235.
J. N. Gray, "Notes on Database Operating Systems", Chapter 3F, pp. 394–481, "Operating System-An Advanced Course", copyright Springer-Verlag Inc. 1979.
Alan Jay Smith, "Computing Surveys", vol. 14, No. 3, "Cache Memories", pp. 473–530, Sep. 1982.
Sakti Ghosh, "Data Base Organization for Data Management", pp. 33–41, copyright 1977 by Academic Press Inc.
C. J. Date, "An Introduction to Database Systems", 3rd Edition, Part 3, re "The Hierarchical Approach", pp. 273–386.
IBM publication GC28-1150, "MVS/Extended Architecture System Programming Library": System Macros and Facilities, vol. 1.

Primary Examiner—Joseph L. Dixon
Assistant Examiner—Hiep T. Nguyen
Attorney, Agent, or Firm—R. Bruce Brodie

[57] ABSTRACT

A computer implemented method for minimizing the grant of pages locks and the number of outstanding locks while ensuring consistency of the copies of pages resident among a first, and a second data cache with the original pages in shared external storage. A first processor requesting a lock on a designated page is granted a lock over the group of pages including the designated page in the absence of a concurrent lock to the page or group held by another processor. Any changed page is copied through to external storage. Otherwise, a processor intending to alter a page causes a global lock manager to notify concurrent lock holders, invalidate copies of the page in their local caches, and obtain an exclusive lock to the requesting process for the duration of its operation on the page. After this the lock is demoted to share and the changed page also copied through to external storage.

6 Claims, 8 Drawing Sheets

STORAGE IN RELATION TO A CPU

METHOD FOR MINIMIZING LOCK PROCESSING WHILE ENSURING CONSISTENCY AMONG PAGES COMMON TO LOCAL PROCESSOR CACHES AND A SHARED EXTERNAL STORE

FIELD OF THE INVENTION

This invention relates to methods for managing computer storage in distributed systems, and more particularly, a method for minimizing both the grant of page locks and the number of outstanding locks while ensuring consistency of the copies of pages resident among a first and a second data cache with the original pages in shared external storage.

DESCRIPTION OF RELATED ART

The following paragraphs summarize the concepts and references deemed pertinent to lock and cache management in a distributed system.

DISTRIBUTED SYSTEM DEFINED, CPU, AND SOME OPERATING CONSTITUENTS

A "distributed system" for purposes of this invention comprises two or more processors having shared access to a DASD oriented external storage subsystem. Each CPU or processor of such a system typically includes a local operating system (OS), RAM oriented internal store, local instruction and data caches operatively formed from processor internal store, the shared access external store, and lock and cache resource managers.

Applications (processes/tasks) executing on a CPU generate read and write operations by way of the OS. In turn, the read and write operations utilize the data cache and lock resource managers to establish directory lockable access paths to pages either resident in the data cache or as refreshed into the data cache from the shared external store.

INTERNAL AND EXTERNAL STORE

Because storage costs increase dramatically with speed, many computer systems divide the physical storage subsystem into a number of performance levels. Some of these levels, such as DASD and tape, have been treated as shared access peripheral I/O devices and are accessed over an asynchronous path. Other levels, such as RAM and cache, have been treated directly by system hardware and accessed over a synchronous path as part of internal storage.

The term "internal storage" specifies that portion of storage randomly addressable for single read or write transfers. In IBM systems, internal storage is byte addressable except for an extension ("expanded store"). Expanded store is random accessed on a block or page addressable (4096 bytes/page) basis. It is managed as an LRU real memory backed paging store. Lastly, "external storage" refers to that bulk portion of storage that is not randomly addressable and must be directly accessed as on DASD.

RESOURCE MANAGERS

As pointed out by Lorin and Deitel, "Operating Systems", The System Programming Series, copyright 1981 by Addison-Wesley Publishing Co., chapter 9 re resource management, a "resource manager" is a software OS construct defined on a CPU and given a set of attributes relating to the accessibility of the resource and its physical representation in the system. Lorin further points out that the function of the operating system in this respect is to define an abstract machine composed of abstract resources that are conveniently manipulated by processes. Thus, technical and economic use and coherence of resources are regulated by resource managers.

It should also be appreciated that a resource manager can also be expressed as a "monitor". A monitor is also a software OS construct comprising a collection of procedures associated with a type of resource. It is responsible for allocating the resource and for controlling references to it. Furthermore, each monitor has exclusive access to any tables or other structures containing information about the resource for which it is responsible. The distinctive feature of the monitor is that it contains a section of data that is designed for public use but that cannot be accessed except through the monitor.

LOCKS AND LOCK MANAGEMENT

A locking function according to Lorin serializes access by processes to at least one selected system resource other than the processor. A lock manager qua monitor in the context of this invention is a software construct for controlling access to cache stored pages among other resources. This is mandated by the need for coherency among pages and directories in general and among versions of the same page in a distributed system having multiple local data caches in particular.

An operating system such as MVS used in the IBM System/370 includes a hierarchy of locks for various resources in the system. Locks are at least a function of name, scope, and exclusivity. With respect to scope, a global lock affects either the entire system or an entire resource. In contrast, a local lock in the storage context may affect only a single address space or a single page or page group. A lock may be exclusive or shared. Shared locks on pages in memory or storage are most often associated with read and copy operations while exclusive locks are associated with write/update and move operations. Also a lock may be atomically promoted or demoted either in scope, exclusivity, or both.

As part of establishing an access path to a cache from a task or process, the cache manager accesses the local or global lock manager as the case admits. Depending upon the nature and scope of the access request and the current state of the lock, the request may be granted in whole or modified form or denied.

Resource managers including cache and lock managers use various tables to indicate the current control state of their resource. The process for grant, modification, or denial of a lock in any particular instance requires the lock manager to access its table and interpret the current state thereof. If the lock state changes in any respect, the lock manager must alter the lock table to reflect that change.

CACHE AND CACHE INVALIDATION

A "cache" may be formed either as a software or hardware resource. It is defined as an indexable LRU ordered collection of pages in a buffer. It is usually positioned in a path to data or instructions so as to minimize access time. If implemented as a software construct, a cache can be located anywhere in processor internal store. Alternatively, an example of a hardware cache may be found in Woffinden et al, U.S. Pat. No. 4,612,612, "Virtually Addressed Cache", issued Sep. 16, 1986. In both the software and hardware form, the cache manager controls the cache through a cache directory and page tables.

Relatedly, the term "cache invalidate" refers to either having the cache manager qua monitor remove the "dirty page" from a cache directory or provide indication that a named page located therein is invalid. Alternatively, the cache manager could cause the updated page to overwrite the current page in cache.

Implementation of directory change evoked when the base page is altered on some other data path would appear as a less data movement intensive alternative to the overwriting. However, an example of page overwriting may be found in Dashiell et al, U.S. Pat. No. 4,843,542, "Virtual Memory Cache for Use in Multi Processing Systems", filed Nov. 12, 1986, issued Jun. 27, 1989. Dashiell obtains consistency in a multiple processor/virtual cache system using main memory as a backing store by having the requesting processor copy a page update to all caches holding the equivalent of a share lock prior to writing to local cache.

THE GRAY, CRUS, AND SMITH REFERENCES

J. N. Gray, "Notes on Database Operating Systems", chapter 3F at pages 394-481, "Operating Systems-An Advanced Course", copyright Springer-Verlag Inc 1979, describes the grant, retention, and removal of locks as a multi-variable lock function of a lock manager responsive to processor requests as applied to relational database access. Gray's lock functions includes scope (course/fine grained), type (exclusive/shared), and class (read or write or both).

Crus et al, U.S. Pat. No. 4,716,528, "Method for Managing Lock Escalation in a Multiprocessing, Multiprogramming Environment", issued Dec. 29, 1987, describes and claims a method utilizing a coordinated pair of locking limits for managing concurrency and lock granularity trade-off relations. A first limit is placed on the number of small granularity locks per resource. A second limit is placed on the number of locks assignable to each process. When the first number of small locks is reached, the method withdraws the small locks and grants only one lock to the entire resource (lock escalation). When a process requests an additional lock over the second limit, the lock is refused.

Alan Jay Smith, Computing Surveys, volume. 14, No. 3 "Cache Memories", pp. 473-530, September 1982, Association for Computing Machinery, describes coherency control among copies of the same page in different caches by way of (a) "broadcast writes" of updates to all caches sharing the same data or (b) cache invalidation.

SUMMARY OF THE INVENTION

It is an object of this invention to devise a method for minimizing the number of locks and their management as utilized by inflight processes defined onto multiple processors in establishing access paths through directory lockable pages, the pages being either stored in local cache or refreshed into cache from external storage.

It is another object of this invention to devise a method for maintaining cache contents consistent with shared external storage (backing store), and for minimizing the overhead associated therewith.

It was observed that in the short run pages are most frequently referenced by one application running on one of the processors of a distributed system. This provides a locality of use within the system. It was further observed that applications in the long run dispatch read references most frequently with respect to sharable pages.

The method based on these observations involves a processor obtaining exclusive access to hierarchically related pages by establishing a large (coarse grained) lock at the start of referencing activity. This avoids both (1) cache invalidates because copies are not present in other caches and (2) the processing a significant number of subsequent subordinate locks to pages within the same tree organized directory by the same processor.

More particularly, the method comprises the mutually exclusive steps of either:

(a) responsive to a write operation by a first processor to a predetermined page, and, in the absence of a concurrent lock on the predetermined page by a second processor, granting an exclusive course grained lock to the first processor on the hierarchy of pages including the referenced page, executing the operation in the first processor cache, and aging the referenced page out of said first processor cache; or (b) responsive to a write operation by the second processor to a predetermined page in the presence of a concurrent lock on that page by the first processor, causing the copy of the page resident in the first processor cache to be invalidated, releasing the first processor lock, granting an exclusive fine grained lock to the second processor, executing the operation in the second processor cache, and demoting the second processor lock to shared.

With respect to step (a), subsequent read/write references by the first processor to the same or other pages within the scope of the course grain lock may be made without adding locks and without incurring any lock (table) management processing. Step (b) provides for an orderly backout of the processor holding the current lock before permitting the other processor exclusive fine grained write access the shared designated page.

DESCRIPTION OF THE PREFERRED EMBODIMENT

The Host CPU Environment for Executing the Method of the Invention

The invention can be conveniently practiced in a configuration in which each CPU in the system is an IBM/360 or 370 architected CPU having an IBM MVS operating system. An IBM/360 architected CPU is fully described in Amdahl et al, U.S. Pat. No. 3,400,371, "Data Processing System", issued on Sep. 3, 1968. A configuration involving CPU's sharing access to external storage is set forth in Luiz et al, U.S. Pat. No. 4,207,609, "Path Independent Device Reservation and Reconnection in a Multi CPU and Shared Device Access System", filed May 8, 1978, issued Jun. 10, 1980.

An MVS operating system is also set out in IBM publication GC28-1150, "MVS/Extended Architecture System Programming Library: System Macros and Facilities", Volume 1, 2nd edition, published 1984, pages 1-66. Details of standard MVS or other operating system services such as local lock management, subsystem invocation by interrupt or monitor, and the posting and waiting of tasks is omitted. These OS services are believed well appreciated by those skilled in the art.

Some Relations Among CPU's, Caches, and Storage

For purposes of this invention, a page consists of a fixed number of data bytes such as 4,096. Also, the term "buffer" is a synonym for "page".

Figure 1:
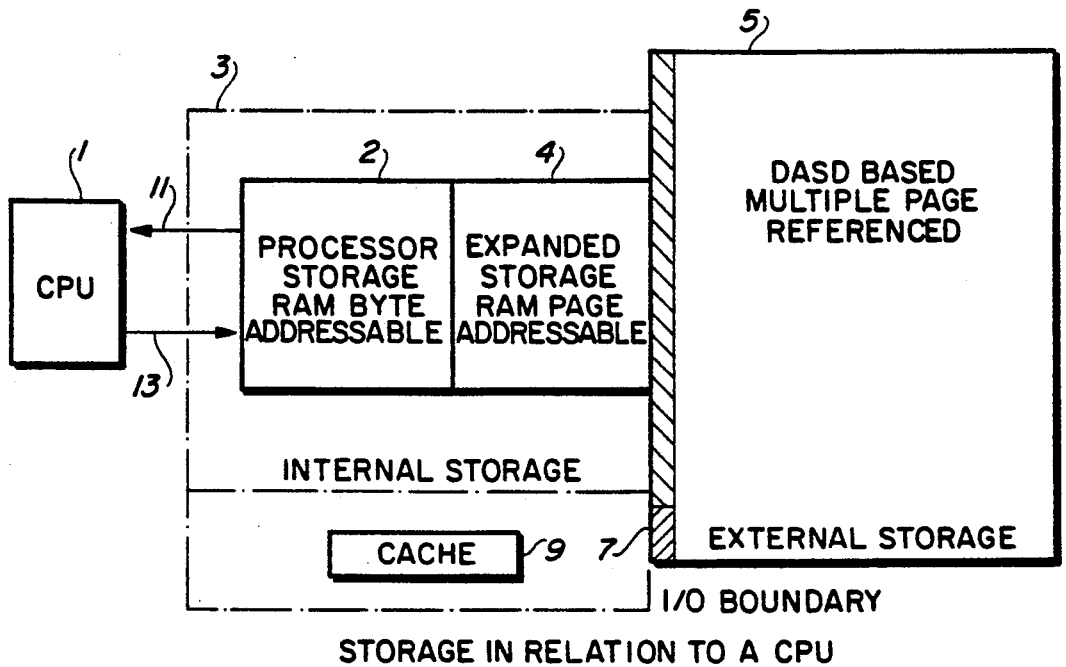
FIG. 1 sets out the organization of storage in relation to a large main frame CPU according to the prior art.

Referring now to FIG. 1, there is shown the relationship of organized storage to the CPU. As depicted, CPU 1 accesses both internal storage 3 and external storage 5 over paths 11 and 13. Internal storage 3 includes processor storage 2 whose contents are byte addressable and randomly accessible and expanded storage 4 whose contents are page addressable and randomly accessible. External storage 5 comprises one or more DASD and stores the page of the information referenced by applications executing on CPU 1.

Typically, an application invoking the CPU processor would reference a page by either its virtual/linear or real space address to a cache. In this regard, cache 9 could be hardware or software implemented. If software implemented, the cache could be located anywhere in internal storage 3. If the page is not available in cache 9, then either expanded storage 4 or not available in cache 9, then either expanded storage 4 or external storage 5 need to be accessed.

Where multiple pages are accessed across the I/O boundary 7 in external storage, they may be processed according to methods as set forth in the above-mentioned Luiz patent. Parenthetically, when a access is made to internal storage the processor waits until the access is completed. When access is made across the I/O boundary, the processor invokes another task or process while awaiting fetch (access) completion.

Virtual Address and Virtual External Storage Address

In the copending Bozman et al, U.S. patent application "A METHOD FOR MANAGING A DATA CACHE USING VIRTUAL EXTERNAL STORAGE ADDRESSES AS ARGUMENTS", Ser. No. 07/477,704, filed on Feb. 9, 1990, there was described a method to manage the access pages mapped into a very large virtual external address space (VESA) through a cache without disturbing the logical view (virtual name) of the data and without having to assign physical or real backing store to said logical view.

In the copending application, two levels of address indirection are used to avoid both synonym problems and multiple copying of pages common to different logical views (page organized files) of the pages in cache. As used, pages are referenced according to their address in a linear space as mapped into a virtual external storage address (VESA) and then as mapped into a physical address in external storage. In this regard, the referenced pages are written into cache using their VESA addresses as indexing arguments. That is, the pages are written into a cache and indexed (ordered) by their VESA addresses.

Lock Management With Respect To Shared Resources

There are several ways by which global lock management of resources can be perfected. One of the simplest is to designate one of the processors (say processor 1) as the repository of the global lock manager including the capability to create an extended table. Also, the cache managers are extended such that when an application executing on processor 2 causes a read or write ops to be dispatched by the OS and trapped by the cache manager for processor 2, the cache manager requests a lock from the lock manager on processor 1. Communication of messages among the processors are perfected either by way of "mail drop" or use of a channel-to-channel adapter.

Hierarchically Related Pages

Pages may be arbitrarily grouped together wherein the group name is the root or node of a tree and the pages are its leaves. Such pages may be externally stored at logically contiguous VESA addresses or real addresses. Contiguity of addresses is a convenience. It does not materially affect the method of the invention.

Certainly, a hierarchic (tree) directory of nodes having leaf pages attaching any of the nodes in balanced or unbalanced fashion are writable to external store. Any such arrangement of pages for purposes of this invention is denominated as a group of "hierarchically related pages". Note, tree organized directory of pages and the like may be found in file management and operating systems for CPU's large and small. Reference can be made to the "IBM Disk Operating System Version 4.0", first edition, copyright IBM 1981, 1988 with respect to the PS2 Mod 60, 70, and 80 family of microprocessor based CPU's and to Sakti Ghosh, "Data Base Organization for Data Management", at pages 33–41, copyright 1977 by Academic Press Inc for a formal description of a hierarchical view of data and relations at a main frame CPU. Also, a programming IMS description is set out in C. J. Date, "An Introduction to Database Systems", 3rd Edition, Part 3 regarding the Hierarchical Approach, pp. 273-386, copyright 1981 by Addison-Wesley Publishing Company.

Scenarios Illustrating the Method of the Invention

Four distinctive referencing patterns are used to illustrate the invention. These are:

(1) a pair of processors with sharable external storage and a global lock facility with one processor reading and writing under exclusive coarse grain locks re FIGS. 2-5.

(2) read only access under shared read only coarse grain locks re FIGS. 6-9.

(3) write access of a page under a shared read/write coarse grained lock followed by a read access re FIGS. 10-13.

Figure 14:
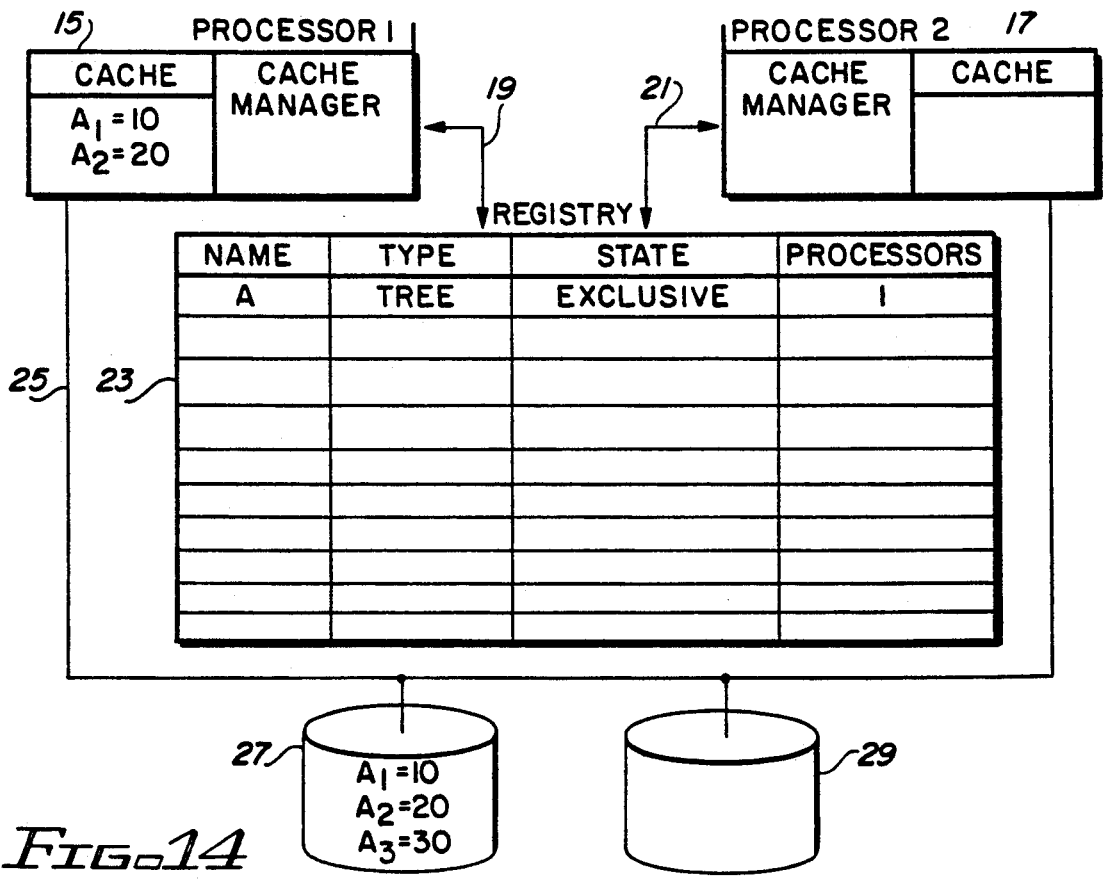
FIGS. 14-16 calls for a write access by a second processor to a page under an exclusive coarse grain lock held on that page by a second processor per the system of FIGS. 2-5.
Figure 15:
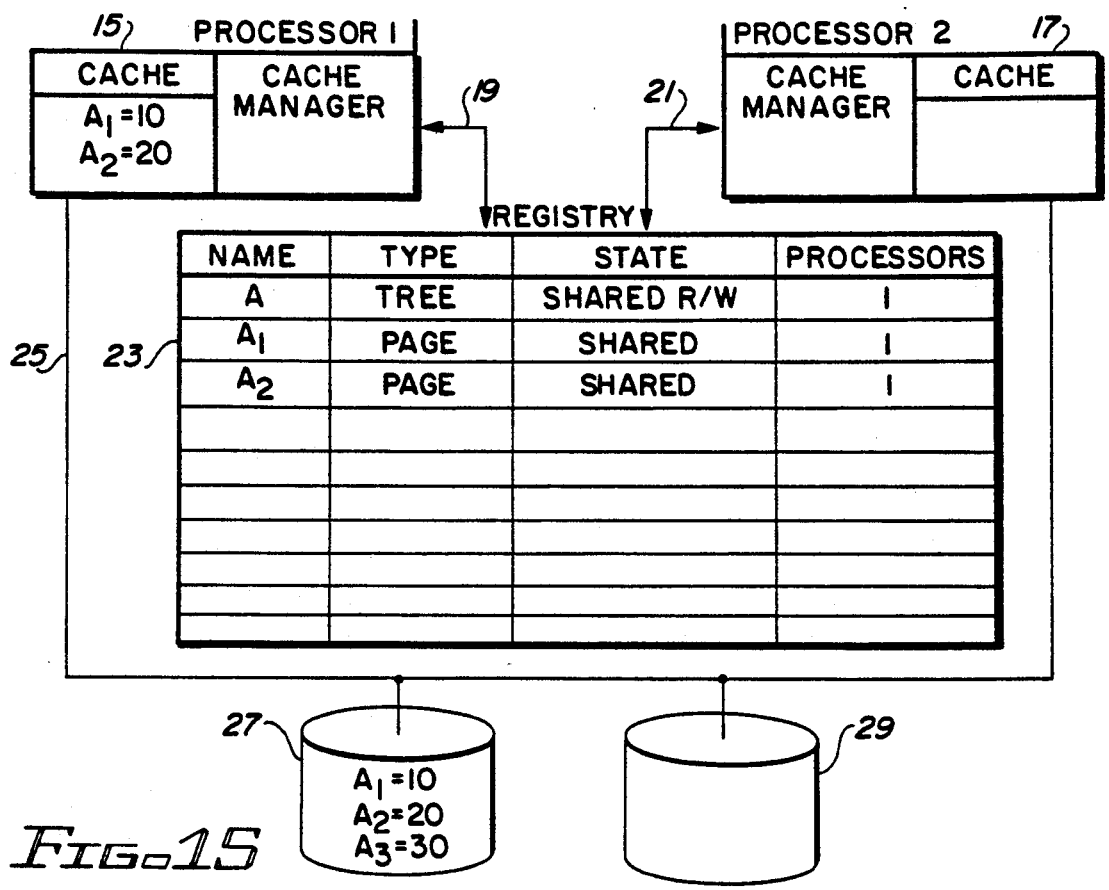
Figure 16:
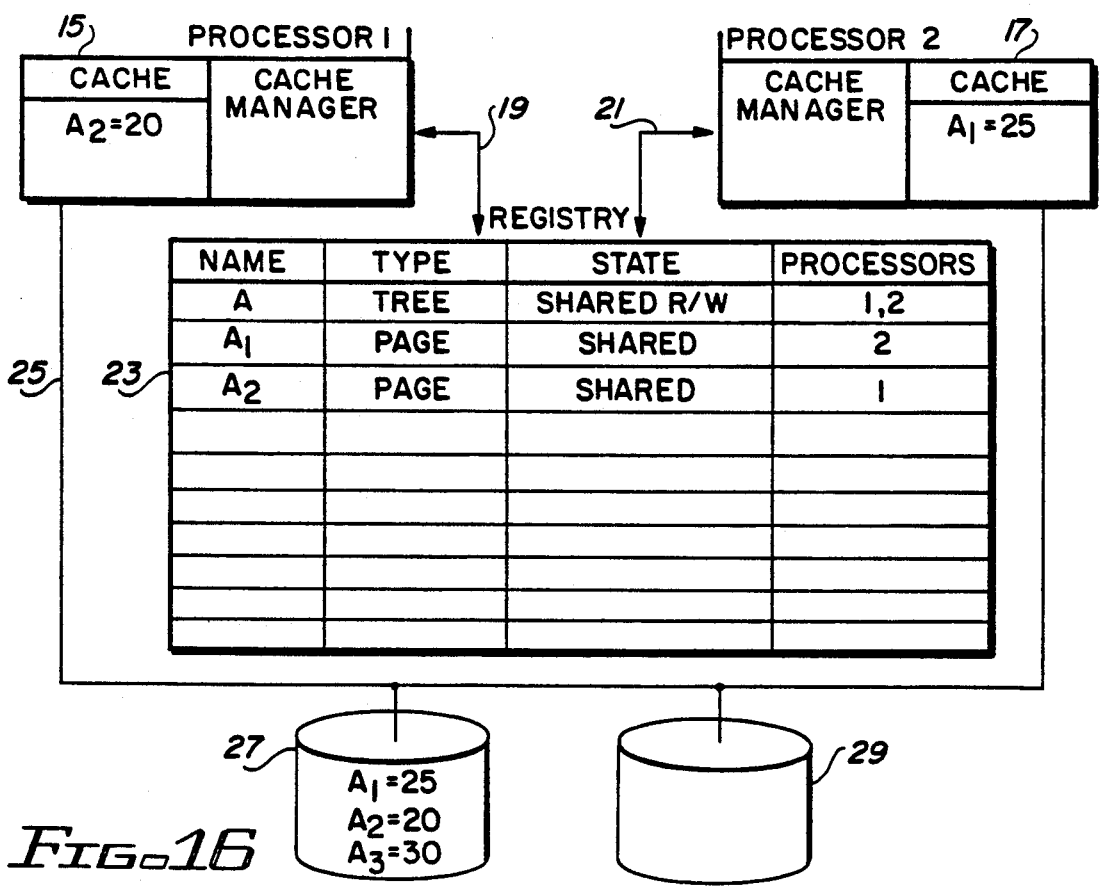

(4) write access by a second processor to a page under an exclusive coarse grain lock held on that page by a second processor re FIGS. 14-16.

Referring now to FIGS. 2-16, there is shown a distributed system in which the only difference among the figures are the contents in external storage, the lock table, and the local caches.

Figure 2:
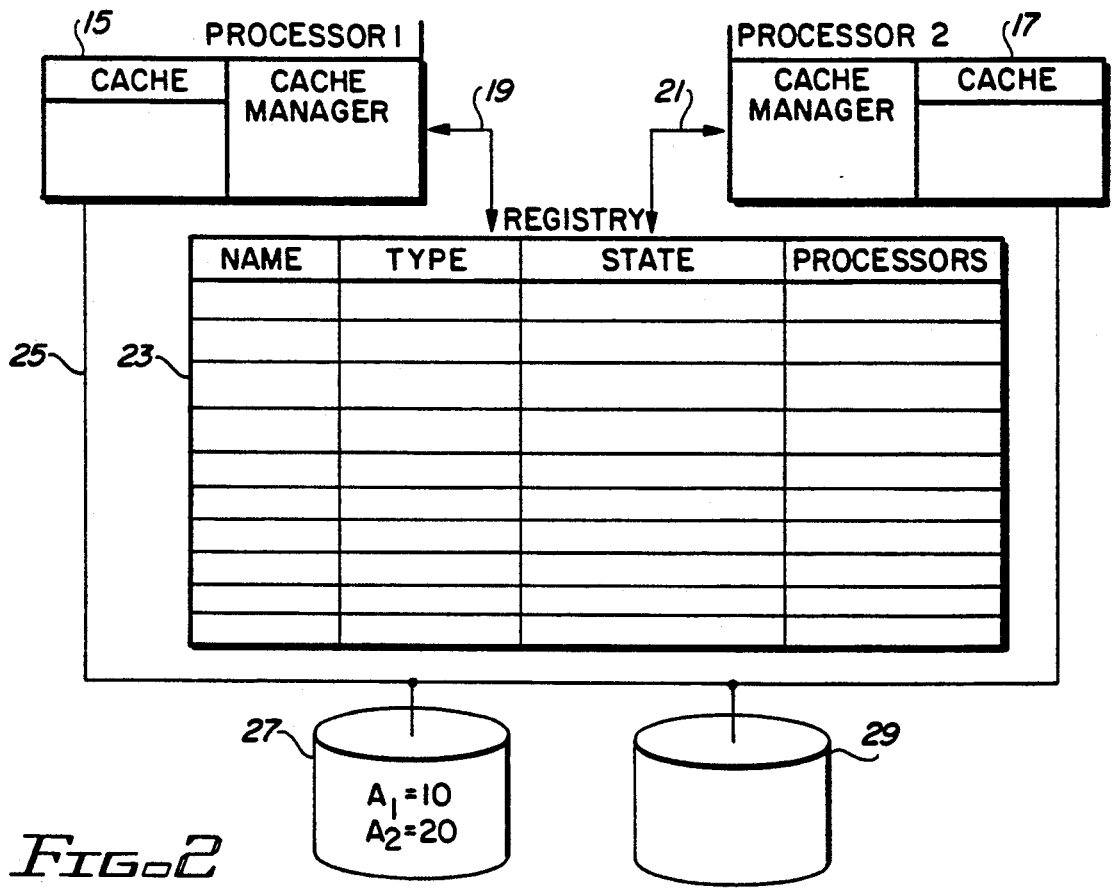
FIGS. 2-5 depict a pair of processors accessing sharable external storage and a global lock facility reading and writing under exclusive coarse grain locks.

Referring especially to FIG. 2, processors 1 and 2 access DASD 27, 29 over path 25. Processor 1 includes a global lock manager (not shown) and lock table 23.

Both processors include respective cache managers and software caches 15 and 17. The cache managers 15 and 17 communicate with the lock manager over paths 19 and 21. Paths 19 and 21 are merely conceptual.

In processor 1, since the lock manager is global it traps lock requests from cache managers 15 and 17. In this regard, path 19 would be a path internal to processor 1 while path 21 would comprise a "mail drop" based upon shared access to a stipulated VESA in external storage. In FIG. 2, lock table or register 23 comprises column attributes of page or page group name, scope, exclusivity, and lock holders.

Exclusive Use Scenario

Figure 3:
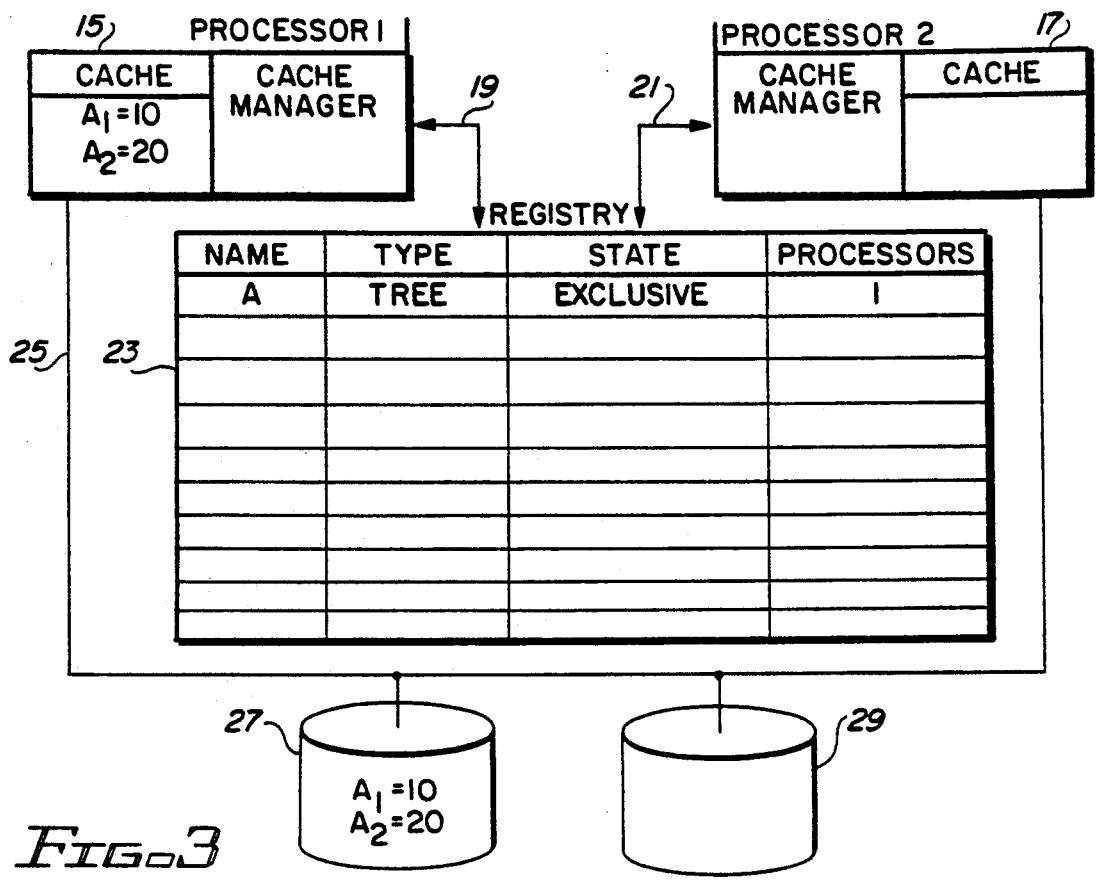
Figure 4:
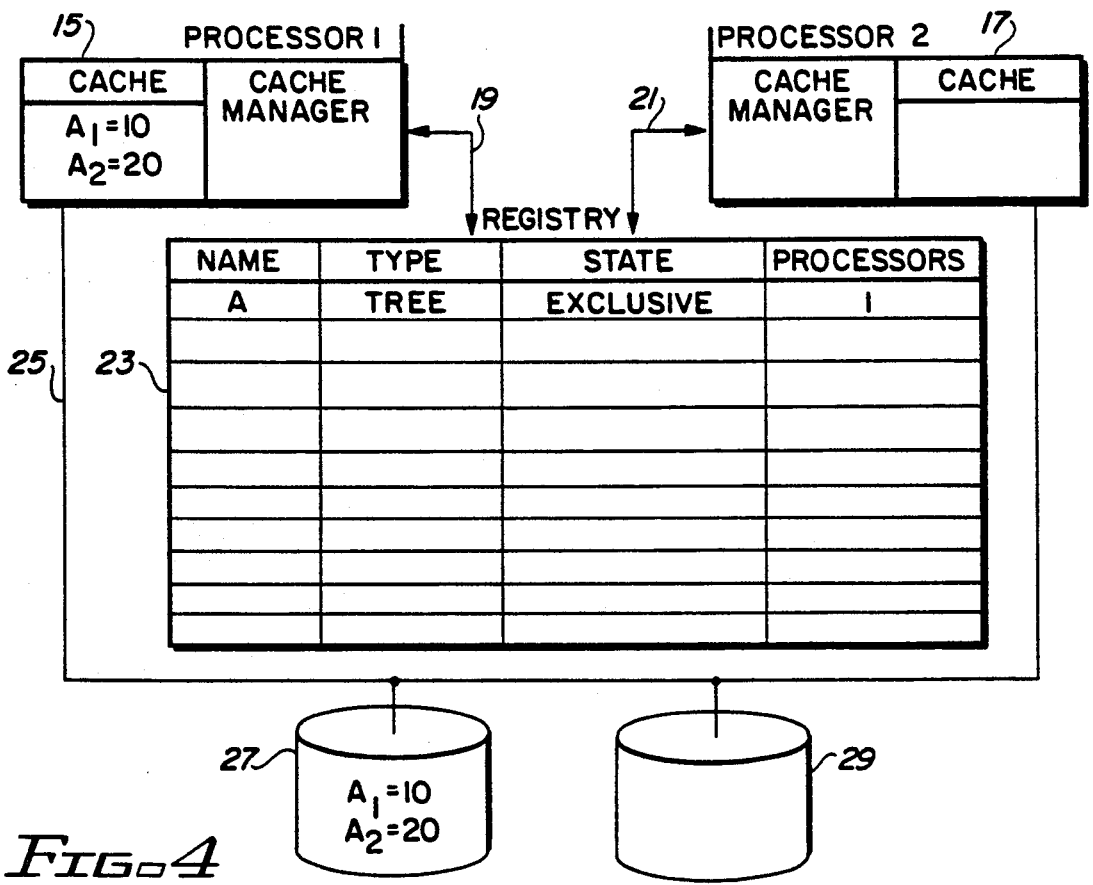

Referring again to FIGS. 2-5, assume that an application executing on processor 1 intends to read access page A1 and write access A2 from the group denominated A currently stored on DASD 27. Since the pages are not resident in the local cache, then cache manager 15, in anticipation of reading A1, requests a lock from the lock manager. In the absence of any other lock to the group A or its pages, an exclusive lock to the group (tree) A is granted in favor of processor 1. The lock grant is recorded in lock table 23. Next, processor 1 copies pages A1 and A2 into cache 15 from DASD 27. Both actions are shown in FIG. 3.

Figure 5:
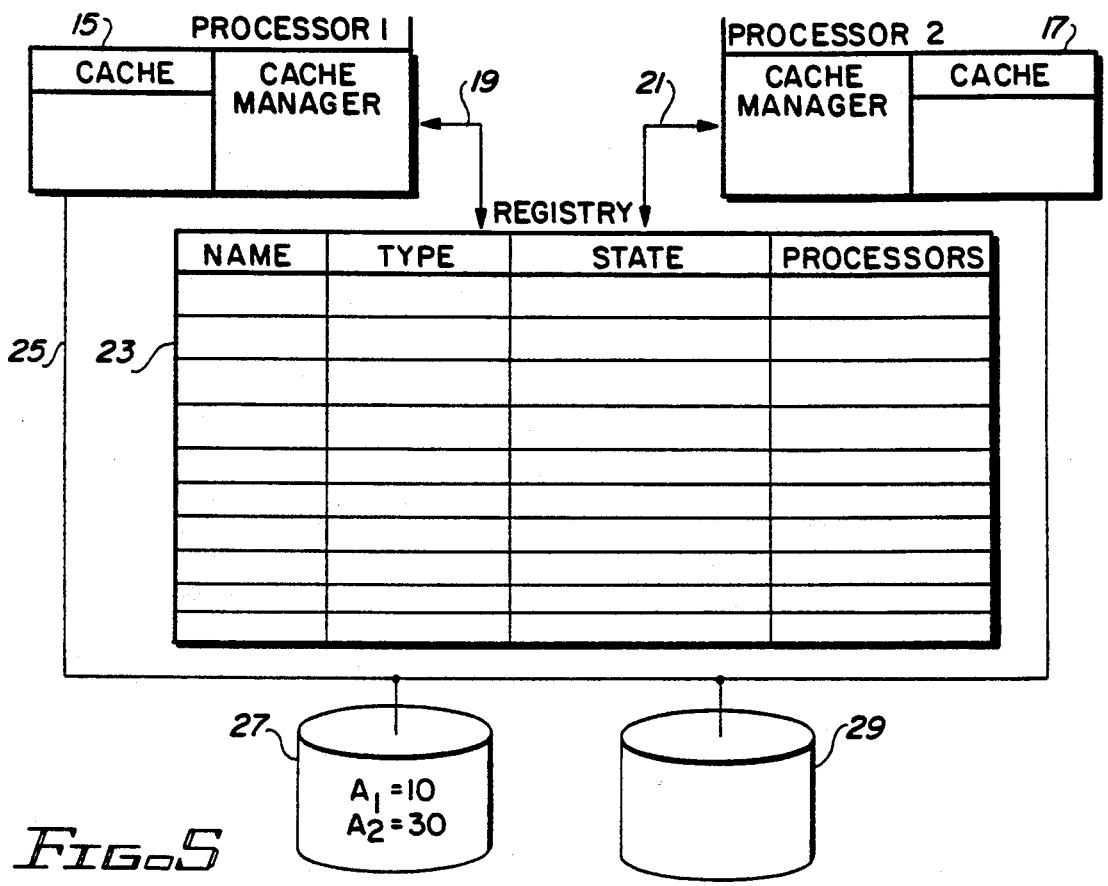

After this page A2 is changed in processor memory to express the value 30 by the application on processor 1. The changed page is written through cache 15 to DASD 27. This state is set out in FIG. 4. Note, that no additional locks need be granted. Absent any other application invoked referencing with respect to group A and to pages A1 and A2, these pages "age out" of the cache and cache manager 15 requests that the lock entry be removed from table 15. After the removal by the lock manager, the system state is depicted in FIG. 5. Parenthetically, the term "age out" is a consequence that caches are frequently "least recently used" (LRU) managed. Thus, a new entry to an otherwise full cache requires removal of the "oldest" page.

Shared Read Only Scenario

Figure 6:
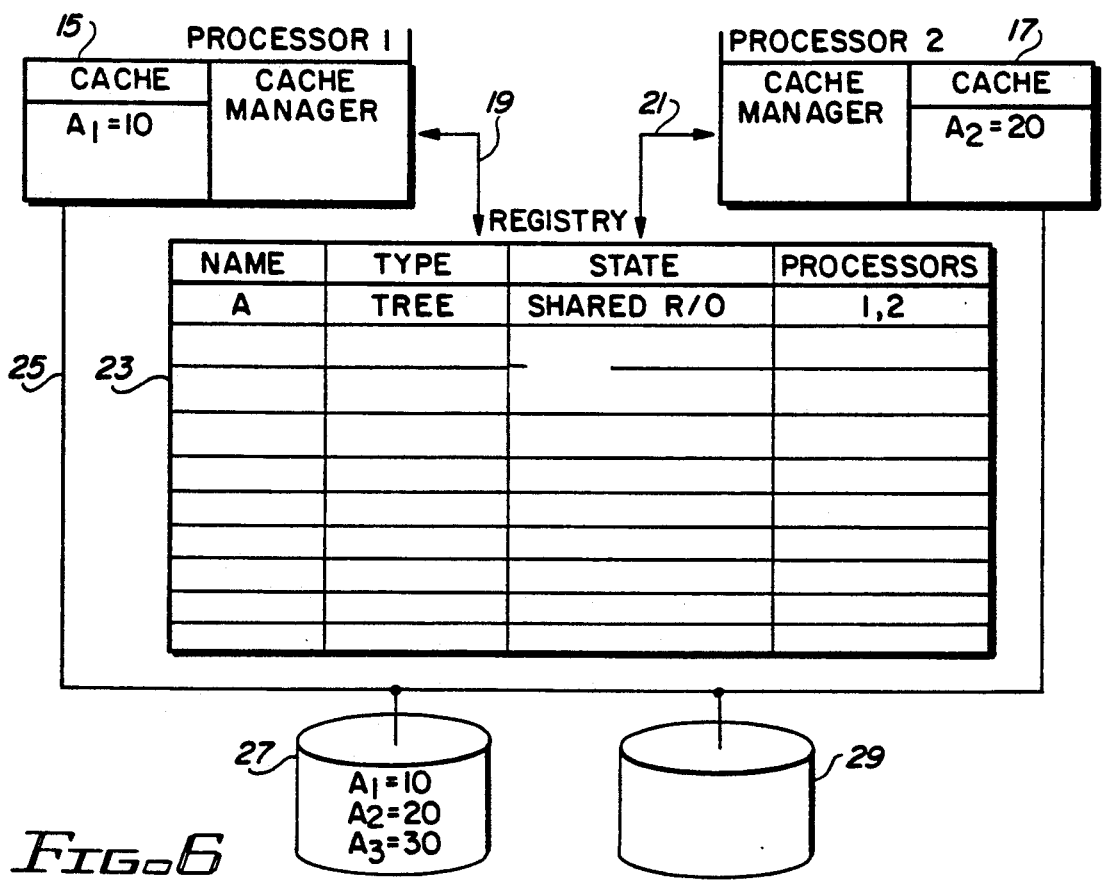
FIGS. 6-9 shows the same distributed system as FIGS. 2-5 with read only access under shared read only coarse grain locks.

Referring now to FIG. 6, lock table 23 assumes that a shared read/only coarse grained lock is held by processors 1 and 2. Also, a copy of page A1 resides in cache 15 and a copy of page A2 resides in cache 17.

Figure 7:
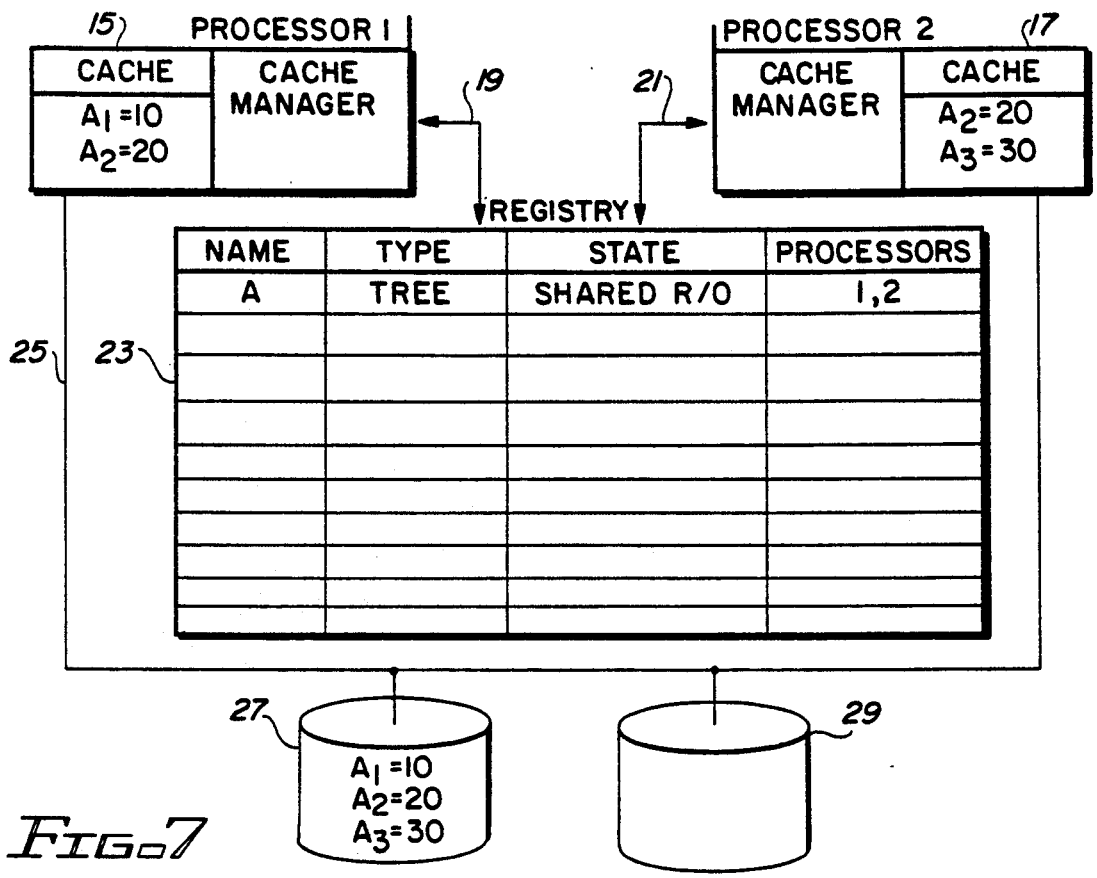
Figure 8:
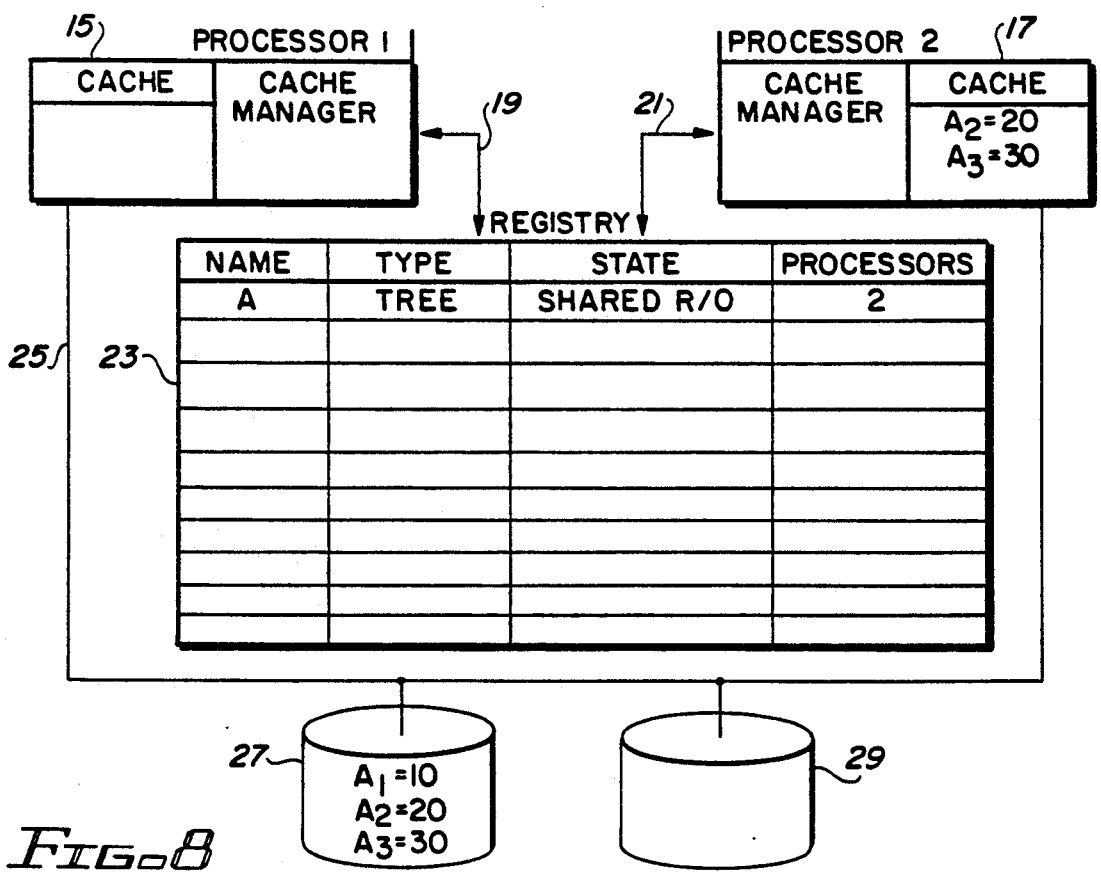
Figure 9:
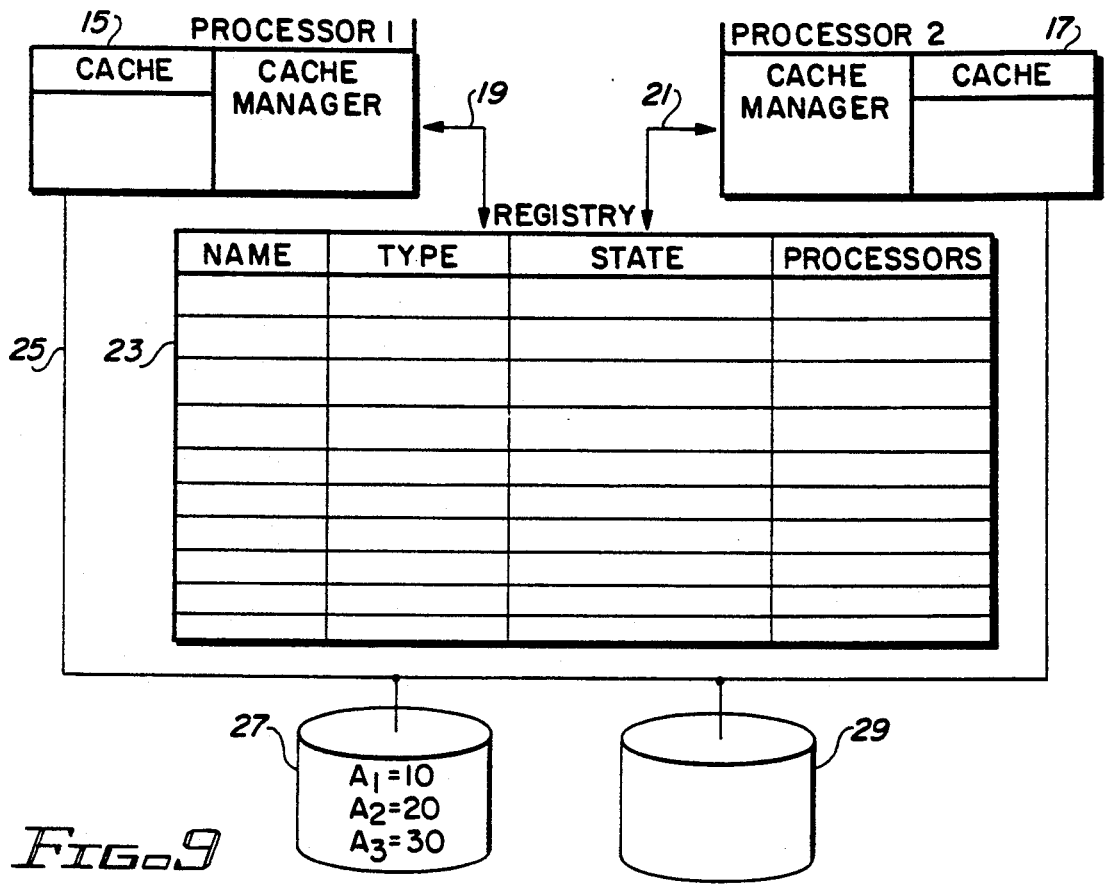

Since a coarse lock is held by both processors, the reading (copying) of page A2 to cache 15 and page A3 to cache 17 can be perfected without additional lock acquisition and processing; this is seen in FIG. 7. If there is no additional referencing pages A1 and A2 by applications running on processor 1, those pages will "age out" of cache 15 and the lock held by processor 1 will be removed. This is illustrated in FIG. 8. Likewise, absent referencing, pages A2 and A3 will be "aged out" of cache 17 and the lock held by processor 2 will be removed from table 23. This is expressed in FIG. 9.

Writing in Coarse Grained Shared Read/Write Lock Scenario

Figure 10:
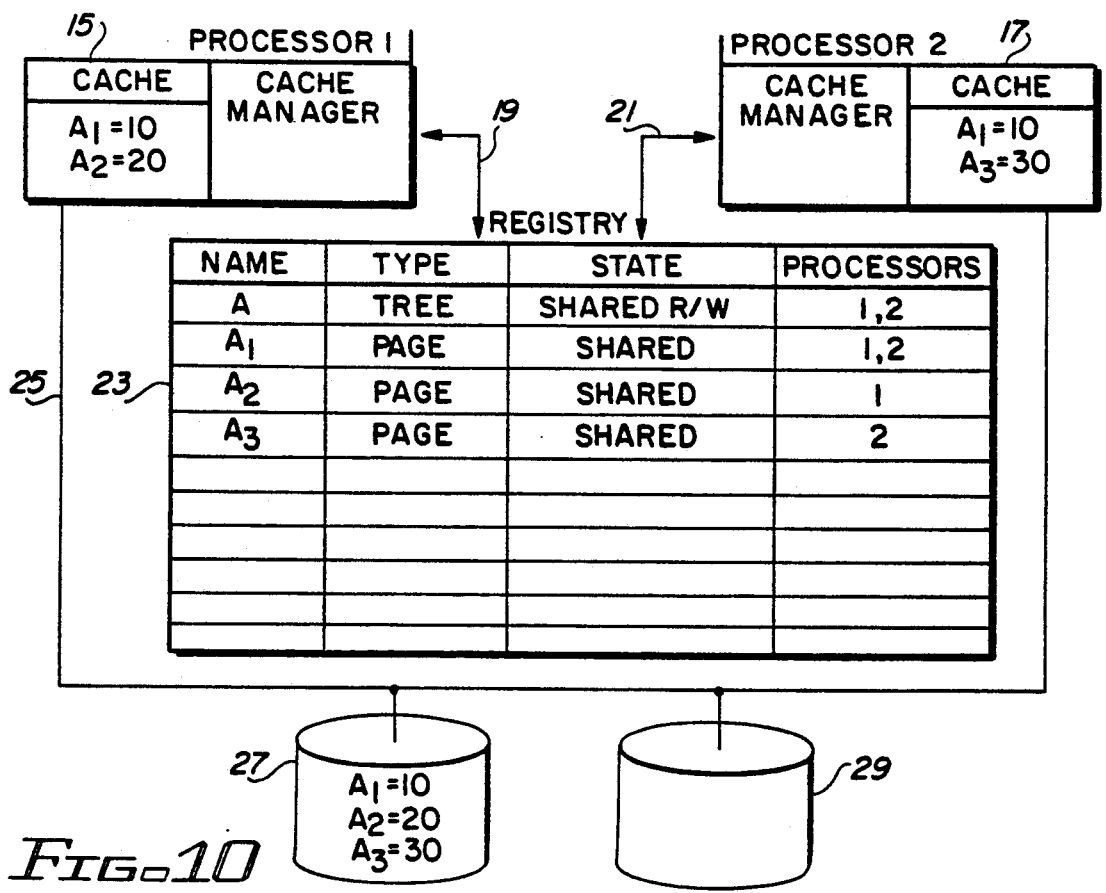
FIGS. 10-13 illustrates the write access of a page under a shared read/write coarse grained lock followed by a read access per the distributed system of FIGS. 2-5.

Referring now to FIG. 10, lock table 23 assumes a coarse grained shared read/write lock on group A held by processors 1 and 2. Also, copies of pages A1 and A2 reside in cache 15 while copies of pages A1 and A3 reside in cache 17. Processors 1 and 2 hold a shared page lock on A1 and respectively hold single shared locks to pages A2 and A3. This state is reflected in FIG. 10.

Figure 11:
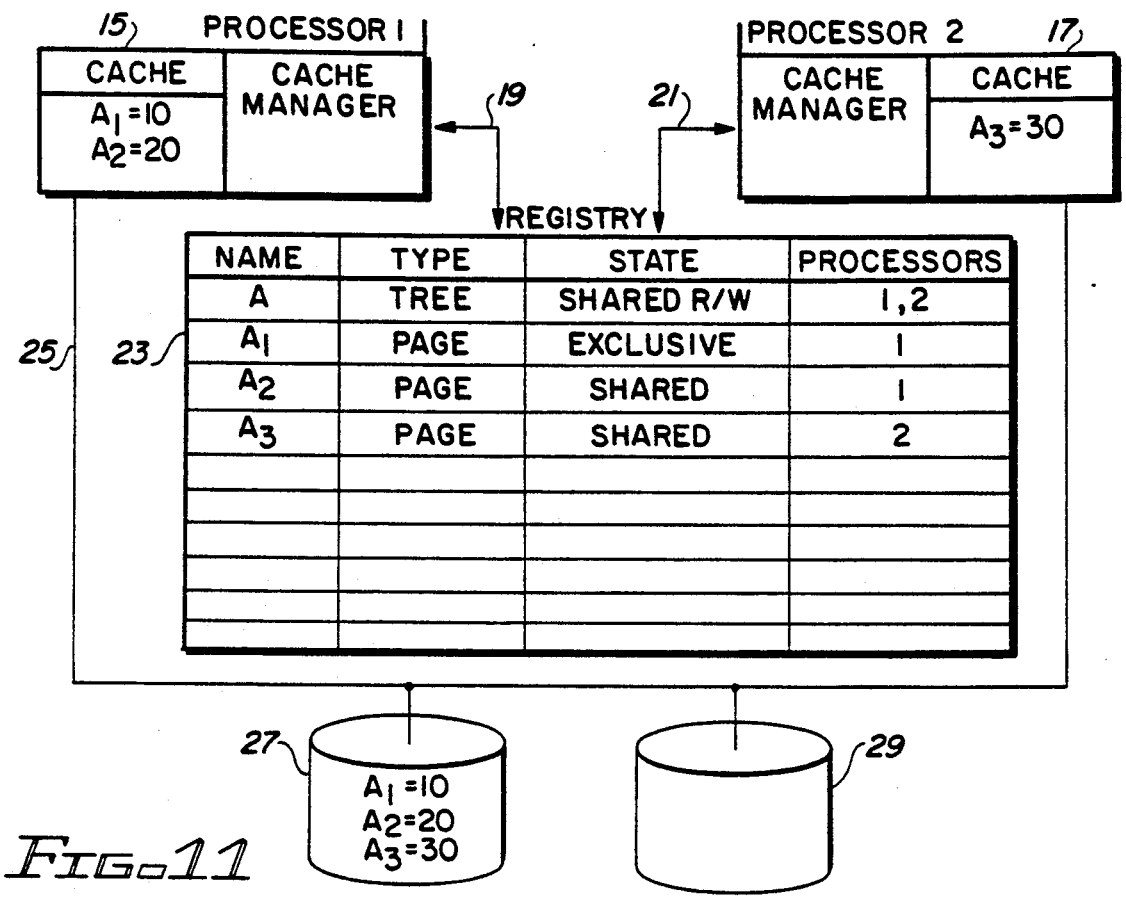
Figure 12:
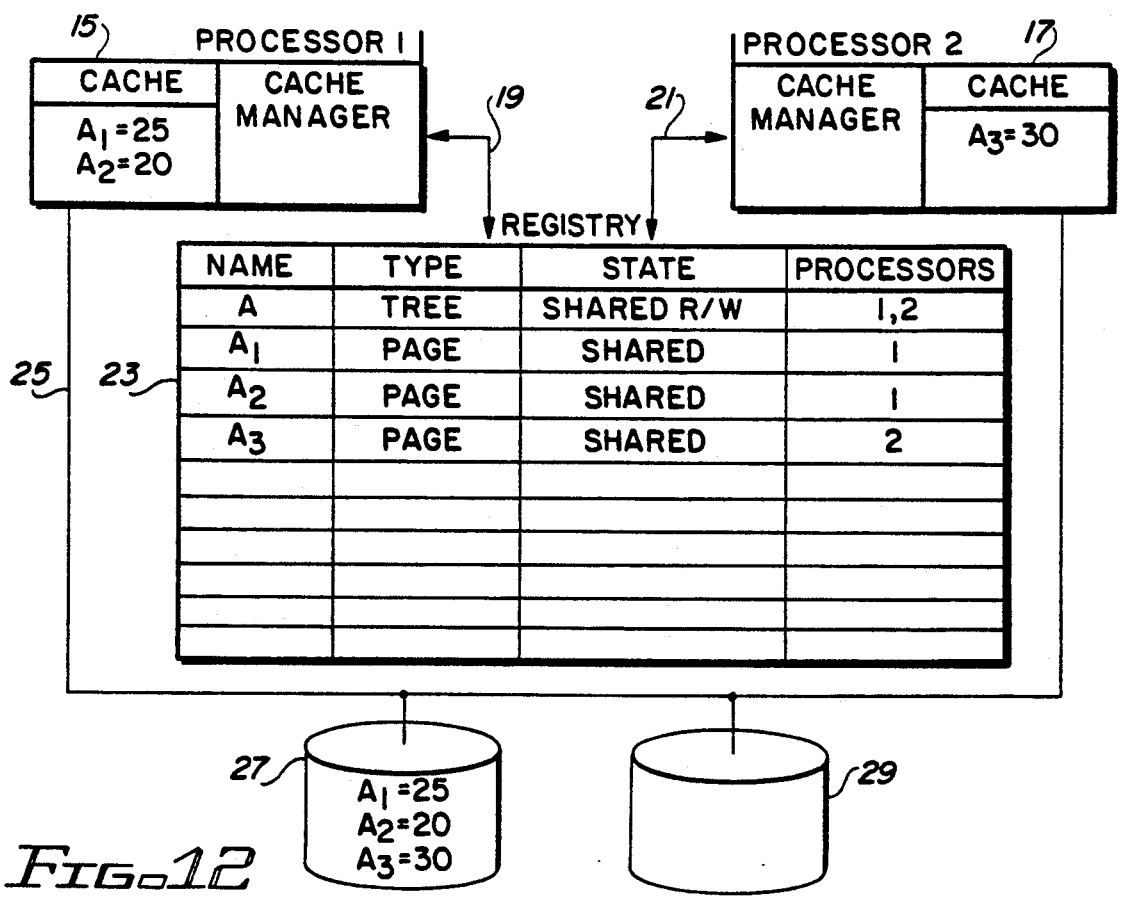
Figure 13:
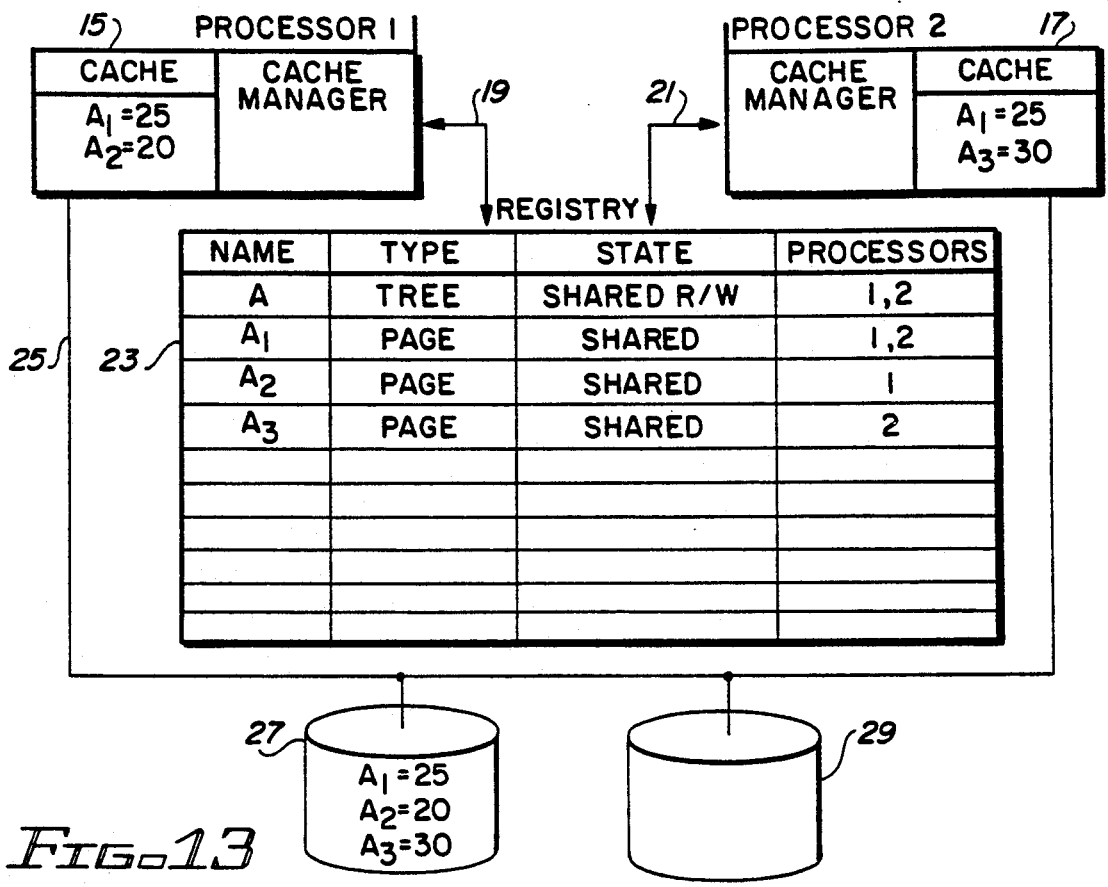

The scenario calls for an application executing on processor 1 to rewrite page A1 changing it from 10 to 25 followed by a read access to A1 caused by an application running on processor 2. At this point, the application running on processor 1 requests the rewrite of page A1 (A1=25). Responsive to the application rewrite request, cache manager 15 of processor 1 requests an exclusive lock on page A1. However, because processor 2 holds a shared coarse grained read/write lock on group A, then it (cache manager 17) is notified of the conflict. This notification also operates to cause cache manager 17 to invalidate or otherwise remove A1 from the cache directory. Concurrent with the page invalidation, the shared lock on page A1 held by processor 2 is removed and an exclusive lock in favor of processor 1 is entered. Thereupon, processor 1 copies page A1 to cache 15. Reference should be made to FIG. 11.

Rewritten page A1 is recorded through cache 15 to DASD 27. Next, cache manager 15 causes the lock manager to demote the A1 page lock from exclusive to shared as expressed in table 23. This system state is found in FIG. 12. Now, the application running on processor 2 requests a shared lock on page A1 prior to execution of a read. After the grant of that lock, revised page A1 (A1=25) is copied to cache 17. This system state is to be found in FIG. 13.

Writing to a Page Held by a Concurrent Exclusive Lock Scenario

Referring now to FIG. 14, the lock table 23 assumes that processor 1 holds a course grained exclusive lock on group A and that copies of pages A1 (A1=10) and A2 reside in cache 15.

If an application executing on processor 2 intends to rewrite page A1, then cache manager 17 requests a coarse grained exclusive lock on group A. Because of the conflict, that request is temporarily denied. However, processor 1 upon being notified of the conflict causes the lock manager to add share locks to pages A1 and A2 resident in its cache 15 and demote the lock on group A from exclusive to shared read/write as the holder in due course. This state of affairs is set out in FIG. 15.

Responsive to a write access to page A1 from processor 2 made to the lock manager by cache manager 17, the shared read/write lock on group A is extended to processor 2. Also the write access requests causes the lock manager to notify cache 15 of the conflict. Next, cache manager 15 invalidates (removes) page A1 from its directory whereupon the lock manager removes processor 1 as a holder of the shared page A1 lock. This results in processor 2 being given an exclusive lock on page A1. Whereupon the application executing on processor 2 rewrites page A1 and copies it through cache 17 to DASD 27. See FIG. 16. Note that the renaming of processor 2 as the holder of an exclusive lock has been omitted.

Extensions

It is the case that the method of the invention describes changing the participation on lock holders (from escalation in the absence of any lock holder to "general sharing" and from "not shared" to "read only shared", and to "read/write shared"). However, the method can be easily modified such that after fine grained write sharing has stopped (such as completion of a page update), the lock state of the system can be returned to a coarse grained shared lock accompanied by the release of all fine grain locks in the same group of pages. Note also, that after "read only sharing" lock state has terminated, then the final lock holder should be given a coarse grain exclusive lock to the same group of pages. Relatedly, the detection of the fact that shared activity has terminated is accomplished by timing out the absence of any shared read/write activity as the case may be. This would cut down the frequency of change of state of the locks.

It should be appreciated that the scope of the locks used need not be limited to just coarse and fine grain. Indeed, a page group could well exhibit a hierarchy of three, four or more echelons and the lock scope adjusted accordingly.

These and other extensions of the invention may be made without departing from the spirit and scope thereof as recited in the appended claims.

We claim:

1. In a system comprising a first and a second processor, a shared addressable external store (27, 29) of groups of hierarchically related pages, and a lock manager (23), said first and second processors each respectively including an operating system (OS), a page oriented write through cache (15, 17), a cache manager, and means including the cache manager responsive to page access requests from said first processor for obtaining at least one lock from the lock manager through the OS, and if a requisite lock is granted by said lock manager, causing the requested page or pages to be copied from external store to the cache if not otherwise resident therein, said lock manager regulating access to pages by granting locks to the requesting processor on either an exclusive or shared basis and either on a coarse grained (covering hierarchically related pages) or a fine grained (page) basis, locks granted but unreleased being denominated "outstanding" locks, a method for minimizing the grant of page locks and the number of outstanding locks while ensuring consistency of the copies of a page or pages resident among the first and second caches with an original page or pages in the shared external store, comprising the steps of:

(a) responsive to an access request by the first processor to a designated page in the absence of an outstanding lock being held by the second processor to that page or a page group including the designated page,
 (1) granting either a coarse grained lock to the first processor on the page group if the request is a read access or an exclusive coarse grain lock if the request is a write access,
 (2) copying the designated page to the first processor cache from the external store if not otherwise available from the external storage to the first processor cache upon the lock being granted,
 (3) operating on the designated page in said first processor cache,
 (4) aging said designated page out of the first processor cache, and
 (5) processing subsequent read or write accesses from the first processor to any page within the scope of the coarse grain lock without granting fine grain locks as long as the coarse grain lock persists;

(b) responsive to a write access request by the first processor to a designated page in the presence of a concurrent lock on that page held by the second processor,
 (1) causing a notice of conflict to be sent to the second processor resulting in the invalidation of any copy of the designated page resident in the second cache,
 (2) releasing the lock to the designated page held by the second processor and granting an exclusive fine grained lock on the designated page to the first processor,
 (3) copying the designated page if not otherwise available from the external store to the first processor cache upon the lock being granted,
 (4) operating on the designated page in the first processor cache, and
 (5) demoting the lock held by said first processor from exclusive to shared.

2. The method according to claim 1, wherein said method further comprises the step of:
(c) responsive to an operation in steps (a) or (b) changing the designated page, copying the changed designated page through the first cache to the external store.

3. The method according to claim 1, wherein said method further comprises the step of:
(d) further responsive to an operation changing the designated page while under a shared fine grain lock in step (b), granting a coarse grain shared lock on the page group and releasing of the fine grain locks.

4. The method according to claim 1, wherein said method further comprises the step of:
(e) further responsive to an operation which does not result in a change to the designated page under a shared fine grained lock, granting an exclusive coarse grained lock on the page group to the processor holding the fine grain lock which last operated on the page.

5. In a system having a plurality of processors, a shared external backing store of groups of hierarchically related pages, and a lock manager, each processor having an operating system (OS), an ORU page organized write through cache, cache manager, and means for accessing the shared external store under control of the lock manager such that a page or pages may be copied into cache from the external store if not otherwise resident in said cache, said lock manager being responsive to page access requests from either processor conditionally by granting locks to the requesting processor on either an exclusive or shared basis and either on a coarse grained (covering hierarchically related pages) or a fine grained (page) basis, locks granted but unreleased being denominated "outstanding" locks, atomically changing its lock state, enqueuing requests for locks, notifying a requesting processor of the grant of a lock and notifying all holders of a lock in conflict, a method for serializing access to and ensuring consistency among pages common to the caches and the external store, wherein the method comprises the steps of:

(a) responsive to an access request by the first processor to a designated page in the absence of an outstanding lock being held by the second processor to that page or a page group including the designated page, (1) granting a coarse grained lock to the first processor on the page group if the request is a read access,
(2) copying the designated page to the first processor cache from the external store if said page is not otherwise available upon the lock being granted,
(3) operating on the designated page in the first processor cache,
(4) aging said designated page out of the first processor cache; and
(5) processing subsequent read or write accesses from the first processor to any page within the scope of the coarse grain lock without granting fine grain locks as long as the coarse grain lock persists;

(b) responsive to a write access request by the first processor to a designated page in the presence of a concurrent lock on that page by the second processor,
(1) causing a notice of conflict to be sent to the second processor resulting in the invalidation of any copy of the designated page resident in the second cache,
(2) demoting the second processor lock to shared if it was exclusive,
(3) granting an exclusive fine grained lock on the designated page to the first processor,
(4) copying the designated page if not otherwise available from the external store to the first processor cache upon the exclusive fine grain lock being granted,
(5) operating on the designated page in the first processor cache and copying the changed designated page through the first processor cache to the external store, and
(6) demoting the lock held by said first processor from exclusive to shared.

6. The method according to claim 5, wherein manifestations of the lock state, resource, and lock holder is selected from the set consisting of a global lock manager operable in a preselected one of the processors, a globally shared directory, and messages to a directory process with private memory executing on a selected one of the processors.

* * * * *